United States Patent [19]

Mayr et al.

[11] Patent Number: 5,221,105
[45] Date of Patent: Jun. 22, 1993

[54] SKI AND A MANUFACTURING METHOD THEREFOR

[75] Inventors: Bernhard Mayr; Helmut Umlauft, both of Hard, Austria

[73] Assignee: HTM Sport- und Freizeitgeraete Gesellschaft m.b.H., Schwechat, Austria

[21] Appl. No.: 808,029

[22] Filed: Dec. 13, 1991

[30] Foreign Application Priority Data

Dec. 14, 1990 [AT] Austria .................. 2548/90

[51] Int. Cl.$^5$ .............................................. A63C 9/00
[52] U.S. Cl. ........................................ 280/633; 280/611
[58] Field of Search ............ 280/611, 610, 601, 633, 280/634, 607, 636

[56] References Cited

U.S. PATENT DOCUMENTS

| 2,526,137 | 10/1950 | Hunt | 280/602 |
| 5,042,430 | 4/1991 | Würther et al. | 280/611 |
| 5,042,829 | 8/1991 | Sedlmair | 280/611 |

FOREIGN PATENT DOCUMENTS

| 0354379 | 2/1990 | European Pat. Off. |
| 3705507 | 9/1987 | Fed. Rep. of Germany |
| 3934888 | 5/1990 | Fed. Rep. of Germany |

Primary Examiner—Richard M. Camby
Attorney, Agent, or Firm—Flynn, Thiel, Boutell & Tanis

[57] ABSTRACT

A ski with a core and at least one upper and one lower surface layer. Grooves for receiving parts of a ski binding are recessed in the upper side of the core. The receiving parts each consist of a fixed holding part and an elastic sleeve surrounding the holding part. A spacer element rests on the receiving part, which spacer element is used as support for the base plate of a ski binding. In order to facilitate the mounting of the ski binding, each holding part has at least one upwardly bent section, with the upwardly bent section extending in the installed state of the receiving part at least to the underside of the upper surface layer of the ski.

10 Claims, 2 Drawing Sheets

SKI AND A MANUFACTURING METHOD THEREFOR

FIELD OF THE INVENTION

The invention relates to a ski having a core with fastening devices in the core to which a ski binding is to be secured and a manufacturing method therefor.

BACKGROUND OF THE INVENTION

A ski is known, for example, from EP-A No. 2 0354 379 and has proven to be successful in practice. The receiving part for the fastening screws is in this known solution designed as a small flat elongated plate and is arranged in the core of the ski spaced from an upper surface layer on the ski. From this stems the problem that the fastening screws, already preinstalled into the ski binding by the manufacturer, are too short for installation on such a known ski and must be replaced with longer, specially manufactured screws by the binding installer. This, on the one hand, requires an additional operation for the binding installer and, on the other hand, incurs the risk of confusion on the part of the installer of not choosing the correct screws. Furthermore, the exact elevational position of the elastically supported receiving part is in the known solution dependent on the manufacturing tolerances, which could possibly result in installation problems.

The purpose of the invention is to solve these problems and to provide a ski of the above-mentioned type in such a manner that the original fastening screws of the ski binding can be utilized for the installation task, and a secure hold of the fastening screws in the respective fixed receiving parts is at the same time guaranteed.

This purpose is attained according to the invention causing each holding part to have at least one upwardly bent section, which in an installed state of the holding part extends at least to the underside of the upper surface layer of the ski. Due to the fact that each receiving part has at least one upwardly bent section, it is assured that the fastening screws can be anchored sufficiently deeply into the receiving part. Due to the fact that the upwardly bent section of the receiving part extends in the installed state to the underside of the upper surface layer of the ski, an exactly defined distance from the upper side of the ski is guaranteed. Furthermore an advantage results from this, namely, that the exact elevational position of the receiving part can be easily monitored during the manufacturing process of the ski.

It is already known from DE-Al No. 39 34 888 to insert a screw sleeve into a damping plug countersunk in the ski such that the upper end section of the screw sleeve projects beyond the upper side of the ski. It is thereby also possible to place the material of the damping plug in addition as a damping layer on the upper side of the ski.

DE-Al No. 37 05 507 discloses a ski with mounting holes already drilled by the manufacturer, these mounting holes being closed off by a foil applied to the upper side of the ski. Possible markings on the protective foil enable thereby the recognition of the mounting holes lying therebelow.

U.S. No. 25 26 137 shows a ski in which a thick rubber layer extending over the entire length of the ski is provided between an upper and a lower fixed layer, which rubber layer keeps the ski tensioned. These known solutions, however, are farther from the invention than the already considered state of the art.

A secure holding of the spacer element during manufacture, during the transport of the ski and during the installation of the binding is made possible by causing the upwardly bent section of the holding part to have a support surface for the spacer element, the spacer element being connected, for example glued, to the support surface, with preferably at least one hole being provided in each upwardly bent section of the holding part, the diameter of which hole is less than the outside diameter of the fastening screw and corresponds preferably with the core diameter of the screw.

BRIEF DESCRIPTION OF THE DRAWINGS

Further advantages and details of the ski of the invention will now be discussed in connection with the drawings, in which.

DETAILED DESCRIPTION

Figure 1:
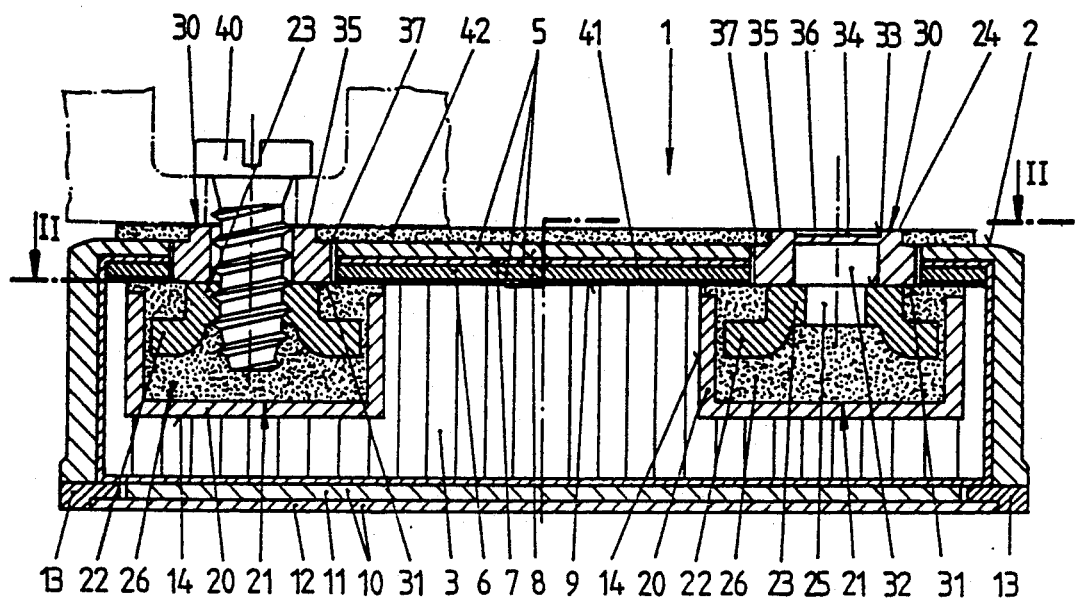
FIG. 1 is a cross-sectional view of the ski with inserted receiving part.

FIG. 1 shows a ski which has an upper side 2, a central core 3 and an upper and a lower surface layer 5, 10, respectively. The upper surface layer 5 is in the illustrated exemplary embodiment composed of a metal layer 6, a fiberglass reinforced laminate 7 and a top layer 8. The fiberglass reinforced laminate 7 is extended laterally and downwardly to form a so-called torsion box and forms also a portion of the lower surface layer 10, which furthermore has a metal layer 11, a running-surface coating 12 and steel edges 13. The design of such a ski 1 is actually known and is not part of the subject matter of the invention.

Two upwardly open and axially elongated grooves 14, arranged approximately parallel and symmetrically with respect to the longitudinal axis of the ski, are recessed in the core 3 of the ski 1. Elongated pocket members 20 are inserted into the grooves, which pocket members are also open in upward direction. An elongated, approximately strip-like receiving part 21 is inserted into each pocket member 20. The receiving part 21 is composed of a holding part 22 made of a solid material (for example metal, plastic or a metal-plastic compound) and a sleeve 26 made of an elastomer material surrounding the holding part. The sleeve 26 can have recesses, for example holes, grooves or semispherical cavities therein in order to further increase its deformability. Such a design is known and is therefore here not described in further detail. The holding parts 22 each have elongated, integrally formed, upwardly bent sections 23 thereon. The upper side of each upwardly bent section 23 is designed as a support surface 24 and has holes 25 therein for receiving fastening screws 40 therein. FIGS. 1 and also 3 show that the elongated receiving parts 21 are aligned with the core 3, with the upwardly bent sections 23 extending up to the underside 9 of the upper surface layer 5. The sleeve 26 made of an elastomer material is dimensioned such that the holding parts 22 are urged slightly upwardly toward the upper side of the ski.

Spacer elements 30 rest on the support surface 24 of each receiving part 21 and are glued to same. A thin elastic insert 41 is additionally provided between the core 3 and the upper surface layer 5, which insert 41 is glued to both the core 3 and also the upper surface layer 5. This insert 41 protects the core 3 against the penetration of moisture. The lower region 37 of each spacer element 30 extends with little clearance through the upper surface layer 5 and projects with its stepped upper end section 35 beyond or through the upper side 2 of the ski 1. Each spacer element 30 has one or several blind-holelike recesses 32 in its underside 31 as shown on the right side of FIG. 1. A corresponding marking 34 is applied to the upper side 33 of each spacer element 30 above each recess 32. A thin closure layer 36 thereby remains between the recess 32 and the marking 34. These just now mentioned details can be recognized, as stated above, in the right half of FIG. 1, where the ski 1 is shown in its ready-to-sell state. The left half of FIG. 1 shows the ski 1 with an inserted fastening screw 40, with the ski-binding part to be fastened being only schematically indicated in broken lines. It can here be recognized that the fastening screw 40 during the installation of the binding extends through the closure layer 36, extends through the blind-holelike recess 32 and is fixedly held in the holding part 22. A comparison of the right and the left side of FIG. 1 shows further that the hole 25 in the upwardly bent part 23 of the holding part 22 has a diameter, which corresponds approximately with the core diameter of the fastening screw 40. FIG. 1 shows furthermore an elastic foil 42 applied to the upper side 2 of the ski 1 in the binding-installation area, which foil 42 encloses or encircles the areas of the spacer elements 30 projecting beyond or above the upper side 2 of the ski 1. Exactly fitting openings 43 are provided for this purpose in the foil 42, which thus prevents dirt and moisture from penetrating into the ski.

Figure 2:
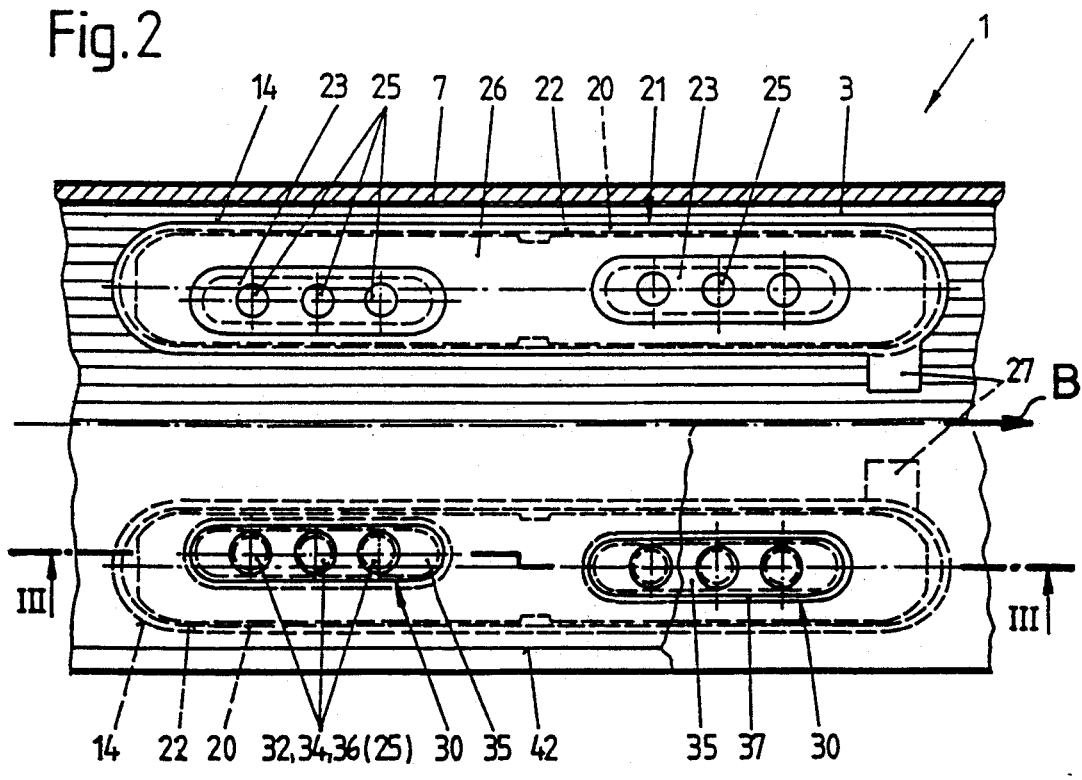
FIG. 2 is a top view of a part of the ski partially taken along the line II—II of FIG. 1.
Figure 3:
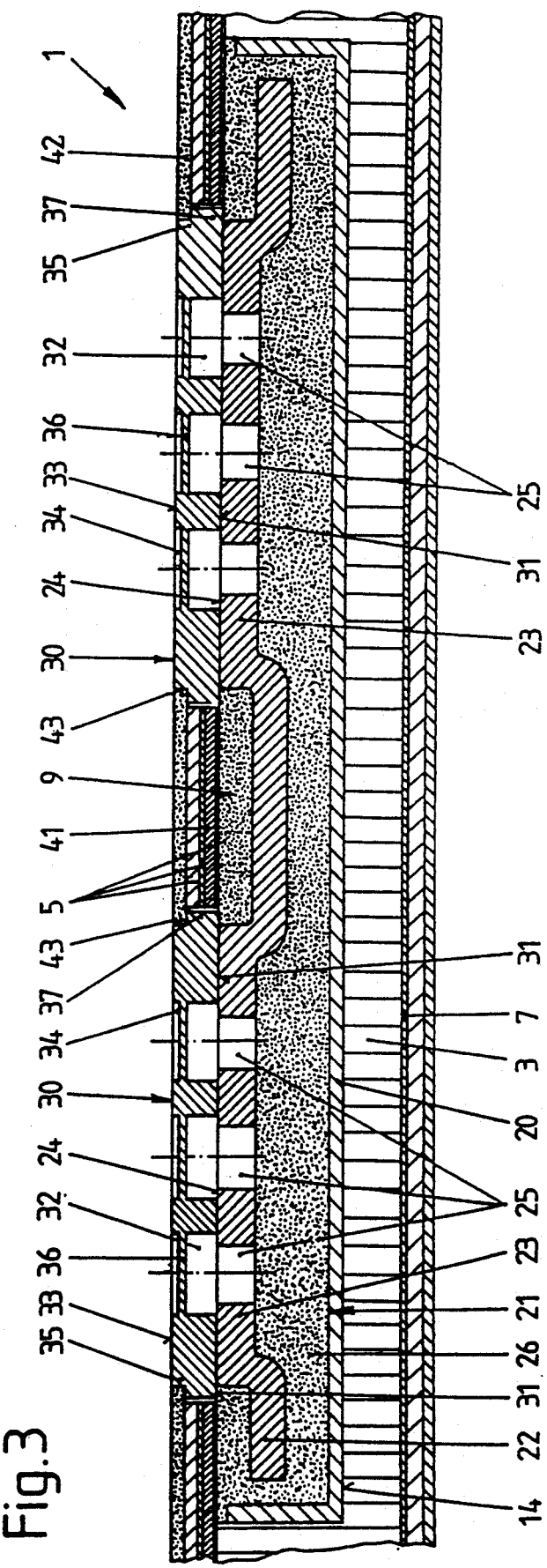
FIG. 3 is a corresponding longitudinal cross-sectional view taken along the line III—III of FIG. 2.

FIG. 2 shows the side-by-side arrangement of the receiving parts 21 in the ski 1. It can thereby be recognized that each holding part 22 has two longitudinally spaced, upwardly bent sections 23, of which one is shifted closer toward the central longitudinal axis A of the ski 1. This arrangement corresponds with the hole pattern of a front jaw. One must thereby imagine the tip of the ski in an extension of the drawing on the right, thus in direction of the arrow B. Of course, depending on the desired type of binding, a different arrangement of the upwardly bent sections can be chosen. Each of the upwardly bent sections 23 has three holes 25 in the chosen exemplary embodiment. The distances between the axes of any two mutually adjacent, longitudinally spaced, holes 25 correspond thereby approximately with the difference in length between two ski-boot sole sizes. Thus, it is possible to mount the binding further to the front or to the rear depending on the size of the boot. Of course, it would also be possible to provide several additional holes, this, however, is not necessary because of the correlation, which has been noted through experience, between the size of the human body and thus the ski length, on the one hand, and the boot size, on the other hand.

In order to achieve a precise arrangement of the receiving parts 21 in the ski 1 and an exact alignment of the axes of the markings 34 of the spacer elements 30 with those of the holes 25 of the holding parts 22, the pocket members 20 and the receiving parts 21 are first inserted into the prepared grooves 14 in the ski provided during a manufacture of the ski. The receiving parts 21, still without holes in the upwardly bent sections 23 of the holding elements 22, are thereby inserted. Lateral plates or tabs 27, recognizable in FIG. 2, extend from the pocket members 20 and serve thereby as an orientation aid for the worker. The thin elastic insert 41 is then applied. The ski 1 is subsequently finished by applying the surface layers 5 and 10. The now finished ski 1 is clamped into a jig, after which, in immediately successive operations, fitting openings for the spacer elements 30 are milled into the upper surface layer 5, the holes 25 are drilled into the upwardly bent sections 23 and the spacer elements 30 are glued in place. The elastic foil 42 is subsequently glued in place.

Figure 4:
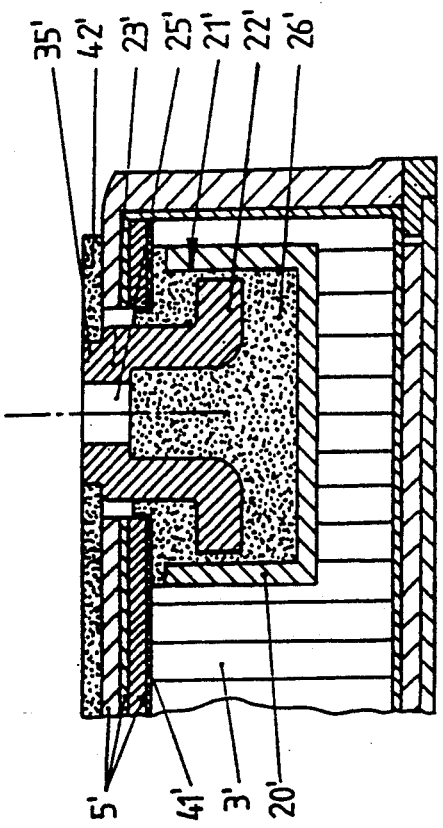
FIG. 4 shows a second modified embodiment in an illustration similar to FIG. 1.

FIG. 4 illustrates a second embodiment. Only the details differing from the first embodiment are described here. The upwardly bent section 23' of the holding part 22' extends to a higher extent in this modification, extends through the upper surface layer 5' and extends beyond the upper side 2' of the ski 1'. The upwardly bent section 23' of the holding part 22' has a stepped end section 35' which is used as a bearing surface for the base plate of a ski binding.

The invention is not to be limited to the exemplary embodiment illustrated in the drawings and described above. Instead, various modifications are possible without departing from the scope of the invention. It would, for example, be possible to insert the receiving parts without pocket members directly into the correspondingly prepared grooves in the ski. It would furthermore be possible to interconnect either the pocket members or the receiving parts themselves with transversely extending webs, with the grooves in the ski then also having to be constructed accordingly. Furthermore, depending on the type of the ski binding to be installed, a different form or arrangement of the receiving parts is possible.

The embodiments of the invention in which an exclusive property or privilege is claimed are defined as follows:

1. In a ski comprising a core and at least one upper surface layer and one lower surface layer, with plural grooves being recessed in an upper side of said core, an upwardly open pocket member being selectively inserted into each groove, said pocket member containing an elongated, strip-like receiving part for receiving fastening screws of a ski binding, said receiving part including a holding part made of a solid material and a sleeve made of an elastomer material, said sleeve at least partly surrounding said holding part, at least one spacer element mounted on said receiving part, said spacer element extending through said upper surface layer of the ski and projecting upwardly beyond the upper side of the ski and adapted to support a base plate of the ski binding and to receive a fastening screw therethrough, the improvement wherein each said holding part has at least one integrally formed, upwardly bent section which extends at least to an underside of said upper surface layer of the ski, and wherein at least one hole is provided in said upwardly bent section of said holding part for threaded engagement with said fastening screw of the ski binding.

2. The ski according to claim 1, wherein said integrally formed, upwardly bent section of said holding part has means defining a support surface thereon for said spacer element, and wherein said spacer element is connected to said support surface, and wherein a diameter of said hole is less than an outside diameter of said fastening screw and corresponds with a core diameter of said fastening screw.

3. The ski according to claim 2, wherein a longitudinal extent of said upwardly bent section of said holding part is greater than a width extent thereof, and wherein two or more holes are arranged spaced from one another in the longitudinal direction of the ski in each said upwardly bent section.

4. The ski according to claim 3, wherein each spacer element has at least one blind-holelike recess in its underside, an axis of each of said blind-holelike recesses being in alignment with an axis of each of said holes in said upwardly bent section of said holding part, and wherein markings characterizing a location of said blind-holelike recesses are provided adjacent an upper end of each said spacer element.

5. The ski according to claim 2, wherein each said spacer element has at least one blind-holelike recess in an underside thereof, an axis of said blind-holelike recess being in alignment with an axis of said hole in said upwardly bent section of said holding part, and wherein markings characterizing a location of said blind-holelike recess is provided adjacent an upper end of said spacer element.

6. The ski according to claim 1, wherein said spacer element including means defining a stepped portion extending upwardly beyond an upper side of the ski, wherein an elastic insert is arranged on said upper side of the ski, an upper end section of said stepped portion extending through said elastic insert, said elastic insert snugly surrounding said upper end section.

7. The ski according to claim 6, wherein between said core and said upper surface layer of the ski int he area of said receiving parts there is mounted a thin elastic insert connected to said core, said spacer element extending also through said elastic insert.

8. A ski comprising a core and at least one upper surface layer and one lower surface layer, with plural grooves being recessed in an upper side of said core, a strip-like receiving part for receiving fastening screws of a ski binding therein being inserted into each said groove, said receiving part including a holding part made of a solid material and a sleeve made of an elastomer material, said sleeve at least partly surrounding said holding part, an upwardly open pocket member received into each said groove, the improvement wherein each said holding part has at least one integrally formed, upwardly bent section which extends through said upper surface layer of the ski, projects upwardly beyond an upper side of the ski to provide a support surface for a base plate of the ski binding and to receive therein the fastening screws for the ski binding, and wherein at least one hole is provided in said upwardly bent section of said holding part for threaded engagement with said fastening screw of the ski binding.

9. In a method for the manufacture of a ski, a body of the ski having a core and at least one upper surface layer and one lower surface layer, receiving parts for receiving fastening screws inserted into said core and into a sleeve made of an elastomer material, the improvement wherein the steps comprise milling grooves at least into an upper side of said core, said grooves extending in a longitudinal direction of the ski, thereafter inserting said receiving parts into said grooves, applying said upper surface layer and said lower surface layer to said core, milling slotted holes into said upper surface layer adjacent said receiving parts, a depth of said slotted holes extending to said receiving parts, drilling holes into said receiving parts, after which closing said slotted holes by gluing spacer elements to said receiving parts.

10. The method according to claim 9, including the step of securing an elastic foil to the ski in a binding-installation area of the ski.

* * * * *